PHOTOGRAPHIC APPARATUS
Filed June 1, 1965 4 Sheets-Sheet 1
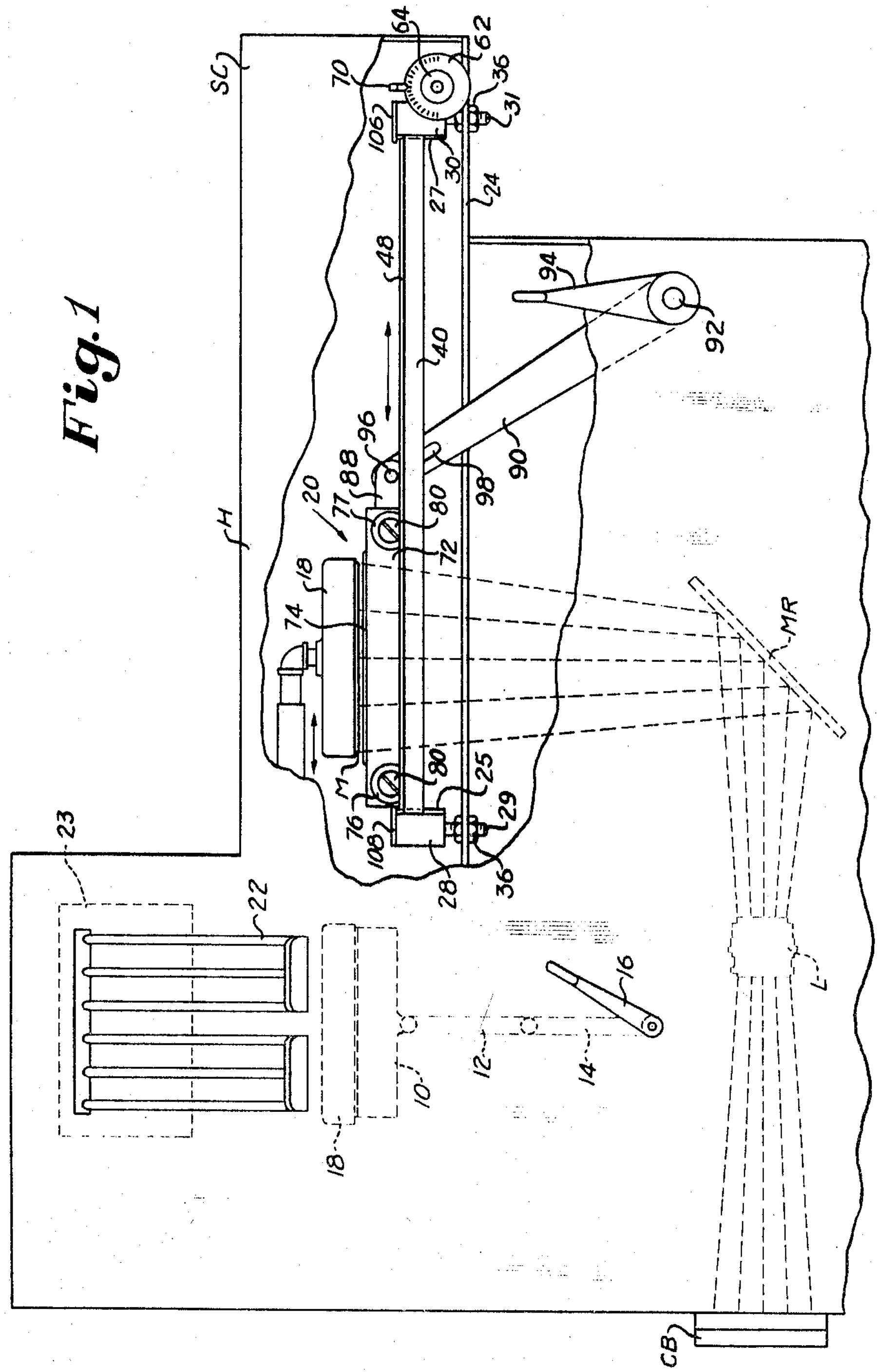
INVENTOR.
JOHN H. GRUVER
BY Russell L. Root
ATTORNEY.

PHOTOGRAPHIC APPARATUS
Filed June 1, 1965 4 Sheets-Sheet 2
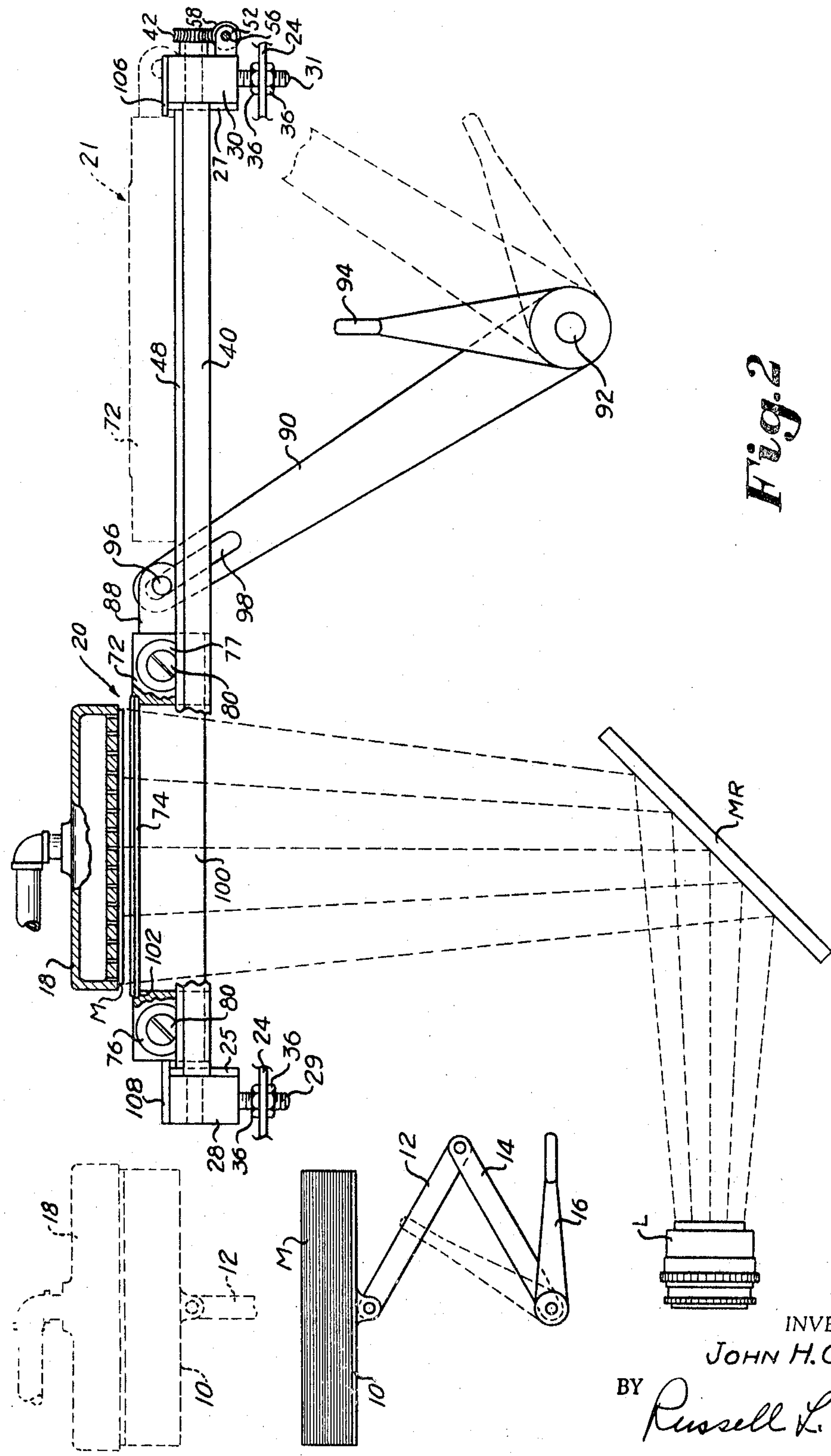

PHOTOGRAPHIC APPARATUS
Filed June 1, 1965 4 Sheets-Sheet 3
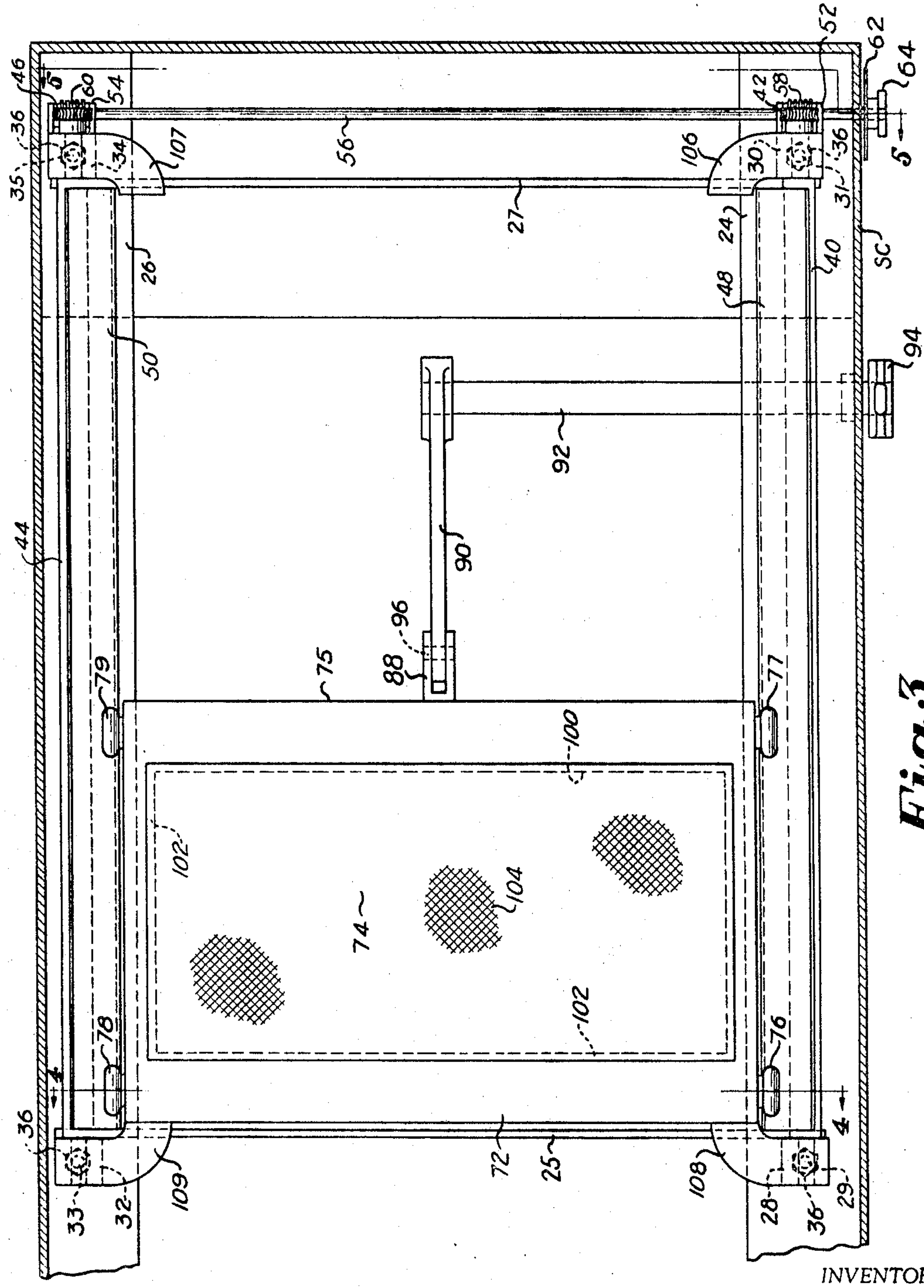
INVENTOR.
JOHN H. GRUVER
BY Russell L. Root
ATTORNEY.

PHOTOGRAPHIC APPARATUS
Filed June 1, 1965 4 Sheets-Sheet 4
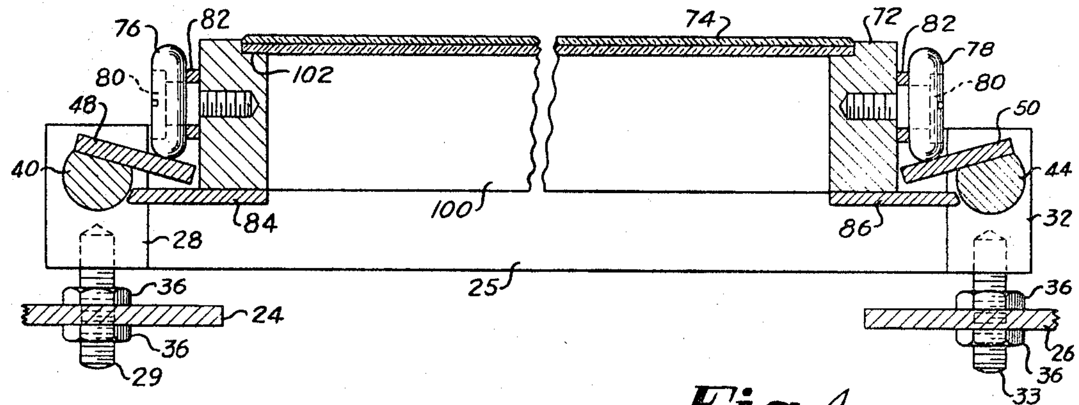
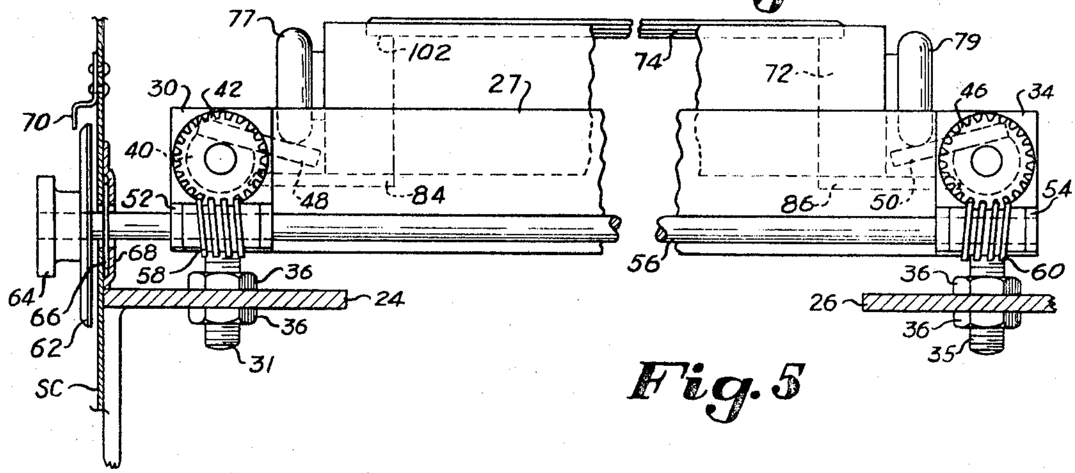
INVENTOR.
JOHN H. GRUVER
BY Russell L. Root
ATTORNEY.

United States Patent Office 3,467,524

Patented Sept. 16, 1969

3,467,524

PHOTOGRAPHIC APPARATUS

John H. Gruver, Cleveland, Ohio, assignor to Addressograph-Multigraph Corporation, Cleveland, Ohio, a corporation of Delaware Filed June 1, 1965, Ser. No. 460,059
Int. Cl. G03f *5/00*
U.S. Cl. 96—116 6 Claims

ABSTRACT OF THE DISCLOSURE

A half-tone screen apparatus for a process camera in which a pair of horizontal guide rails are provided for supporting the screen by gravity for movement between an operative position in spaced relationship to a photosensitive sheet at an exposure station and an inoperative position remote from the exposure station all within a light-tight housing. Adjusting means are provided for raising and lowering the guide rails to thereby position the screen, in a vertical direction, in accurate parallelism with and in accurately spaced position adjacent the sensitized sheet at the exposure station.

The present invention relates to photographic apparatus and, more particularly, to a photographic screen apparatus for producing a half-tone image on a photosensitive member such as an offset master.

As is well known in the art, in order to reproduce a continuous tone image on a photosensitive member, it is necessary to utilize a photographic screen, generally referred to as a "half-tone screen," positioned between the camera lens and the photosensitive member during exposure of the member to an original. The screen is effective to break up the original image into a multiplicity of minute dots, and it is these dots that are reproduced on the photosensitive member. Of course, the photosensitive member so imaged may be an offset master which can be utilized to reproduce copies on conventional offset equipment to produce high quality copies as a result of the tonal gradation afforded by the half-tone image.

It will be appreciated that the procedure for providing a half tone image on a photosensitive member is time consuming and requires the services of fairly skilled help. In addition, the equipment required to practice the foregoing method is cumbersome and expensive and, therefore, not readily adapted for use in small quarters or by small organizations who cannot justify the cost of such equipment.

A machine which is commercially available for imaging photosensitive members, particularly offset masters, is the model 705 camera processor distributed by the assignee of the present invention. This machine is designed for automatic operation and can be used to expose and develop offset masters as well as preparing conventional negatives. The unit has met with a great deal of success in that it provides for the rapid production of offset masters without the need for an intermediate such as a negative or matrix, and the completed master may immediately be placed on an offset machine to produce duplicated copies. In addition to the rapid and convenient operation of the model 705, it does not require the services of highly skilled personnel.

Although the above-described machine incorporates various desirable features in the area of simplified and multiple master production, until the development of the device of the present invention it was not possible to prepare half-tone imaged masters therewith. Accordingly, it is an object of the present invention to provide a photographic screen device adapted to be installed on an automatic camera processor to permit the production of half-tone imaged offset masters.

Another object of the invention is to provide for positioning a photographic screen in proper exposure relation to the master being imaged to produce a half-tone imaged master from a continuous tone original document, and for easily and readily withdrawing it from and replacing it in exposure relation without danger of injury to the screen.

Another object of the invention is to provide for consistently positioning the screen in accurate spaced alignment adjacent the master being imaged after each withdrawal.

Another object of the invention is to provide adjusting means to control the distance of the screen with respect to the master to obtain varying degrees of tonal gradation for the reproduction of sharp half-tone images from a wide variety of original documents.

Another object of the invention is the provision of an arrangement whereby the screen can be readily withdrawn from and replaced in precise exposure relation with the master being imaged, without danger of exposing the photosensitive surface to extraneous light during the operation, and without danger to the fragile screen.

Another object of the invention is to provide a device to produce half-tone images on offset masters which is simple in construction, easy to operate and which is effective to produce imaged masters of high quality by operators of very limited skill and experience.

The foregoing objects of the present invention are obtained by providing a photographic screen assembly adapted to be positioned between an inoperative position and an operative position at an exposure station all within a light-tight housing. The screen assembly is provided with roller means which ride on a pair of guide rails, thereby affording free and easy movement of the assembly into accurate alignment at the exposure station. Further, means are provided for adjusting the spacing of the screen assembly from the master being imaged to obtain high quality half-tone images from a wide variety of continuous tone originals to be reproduced.

Other and further objects and advantages of the present invention will be apparent from the following description and claims and are illustrated in the accompanying drawings which, by way of illustration, show the preferred embodiment of the present invention and the principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is an elevation, partially broken away, of photographic apparatus for producing an offset master, and showing particularly the screen assembly for producing half-tone images in accordance with the present invention;

FIG. 2 is a view similar to a portion of FIG. 1 but omitting the housing and showing the screen assembly in greater detail and on an enlarged scale, partially broken away, and also illustrating alternate positions of the parts;

FIG. 3 is a plan view of the screen assembly of FIG. 2, additionally showing the housing in section and omitting the vacuum head;

FIG. 4 is a condensed section on line 4—4 of FIG. 3; and

FIG. 5 is a condensed section taken on line 5—5 of FIG. 3.

The apparatus, shown in general outline in FIG. 1, represents a commercially available model 705 camera processor distributed by the assignee of the present invention, and additionally illustrates a novel photographic screen assembly for producing half-tone images and the position at which it is mounted in the camera processor. As shown therein, the camera processor comprises a light-tight housing H, a supply tray 10 for holding a stack of sensitized offset masters M and adapted to be raised and lowered by a link 12 and an arm 14 connecting the tray to an operating handle 16. A horizontal vacuum head 18 is provided above the tray and serves to remove a master M from the top of the stack. The head 18 is movable between the dotted line position above the master supply tray and the full line position at an exposure station indicated generally at 20. A copyboard CB for holding in a vertical position an original document to be copied is provided at one end of the camera processor, from where the original image is projected through a lens L, onto a mirror MR and then to the sensitized surface of the master M positioned in a horizontal plane at the exposure station 20 by the vacuum head 18. Although not shown in the drawings, the apparatus also includes, of course, a conventional lighting system for illuminating the copy during exposure of the master.

In operation of the camera processor, the handle 16 is actuated to move the supply tray upwardly to where the vacuum head 18 removes the top master in the tray, whereupon the tray is again lowered by the handle 16. The vacuum head is then automatically moved to the exposure station 20 where it retains the master, sensitized surface face down, during the exposure period. On completion of the exposure, the vacuum head travels back to its start position and delivers the exposed master to a pair of feed rollers which transport the master edgewise into a processor unit indicated diagrammatically at 23 in FIG. 1. The processor unit develops and fixes the image on the master, and the master is thereafter ejected onto a receiving rack 22 outside the housing. A master so processed may be used directly for reproducing copies on a duplicator or it may be stored for future use.

The novel device of the present invention comprises manually operable means for positioning a photographic screen at the exposure station 20 to produce a half-tone image on a master from an original document containing a continuous tone image, such as a photograph, and for withdrawing such a screen from the exposure station. A pair of support plates or ledges 24 and 26 are rigidly attached to the side plates of the camera processor to afford a mounting base for the screen assembly. A set of adjustable mounting blocks 28, 30, 32 and 34, each provided with a depending threaded stud 29, 31, 33 and 35, respectively, are fastened to the ledges 24 and 26 by positioning the studs in clearance holes provided in the ledges and retaining each of the blocks secure to the ledges by a pair of lock nuts 36. The blocks are also tied together by a pair of tie straps 25 and 27 which maintain the blocks in alignment and prevent them from shifting. Tie strap 25 is rigidly secured at its ends to the blocks 28 and 32, and tie strap 27 is fastened at its ends to the blocks 30 and 34.

As shown in FIGS. 1, 2 and 3, a bar 40 is journalled in blocks 28 and 30, and the end of the bar journalled in block 30 extends outwardly beyond the block and has a worm wheel 42 pinned thereon. The other pair of blocks 32 and 34 have a like bar 44 journalled therein, and the end of the bar journalled in block 34 extends outwardly beyond the block and has a worm wheel 46 pinned thereon. As shown in FIGS. 4 and 5, the bars 40 and 44 are each provided with an axial flat surface extending substantially the full length thereof, to facilitate the mounting thereon of guide rails 48 and 50 respectively. Any suitable means may be used to rigidly secure the guide rails to the bars.

With reference to FIGS. 2, 3 and 5, it will be seen that the blocks 30 and 34 are provided with U-shaped brackets 52 and 54 respectively, affixed to the blocks at a position directly beneath the worm wheels 42 and 46. The brackets are each provided with a pair of aligned holes and serve as bearing members for a shaft 56 rotatably journalled therein. Positioned within the bracket 52 and pinned to the shaft 56 is a worm 58 in mesh with the worm wheel 42, and positioned within bracket 54 and pinned to the shaft 56 is a worm 60 in mesh with the worm wheel 46.

One end of the shaft 56 extends outwardly through a side cover SC of the camera processor and has a graduated dial 62 and a knob 64 securely fastened thereon. While the shaft 56 can be retained against axial displacement in any conventional manner, the arrangement shown in FIG. 5 of the drawings comprises a C-washer 66 positioned on the shaft 56 and between the side cover SC and a retaining member 68 provided on the inside of the side cover. A pointer 70 is also mounted on the side cover to facilitate positioning and reading of the graduated dial 62. From the foregoing, it will be understood that turning of the knob 64 rotates the shaft 56 which, in turn, rotates the bars 40 and 44 in opposite directions through the worms and the worm wheels to change the angular position of the guide rails 48 and 50, for a purpose to be further explained hereinafter.

As shown in FIGS. 2 and 3, a frame 72 having a photographic screen 74 mounted therein is positioned between the bars 40 and 44 and is supported by gravity for movement on the guide rails 48 and 50 extending horizontally between an operative position shown in full lines at the exposure station 20, and an inoperative position shown in dotted lines at 21 in FIG. 2. With reference to FIG. 3, the frame 72 is provided at each of its ends with a pair of rollers 76, 77 and 78, 79 in rolling contact with the guide rails 48 and 50, respectively. Preferably, crown rollers are utilized so that they will maintain rolling engagement with the guide rails regardless of the angular setting thereof. The rollers are fastened to the frame 72 by shoulder screws 80 and are spaced from the frame by spacers 82, thereby allowing free rotation of the rollers on the screws. The ends of the frame to which the rollers are mounted are also provided at their bottom edges with straps 84 and 86 which run the full width of the frame 72 and extend laterally from the inside surface of each of the end walls of the frame to close proximity to the bars 40 and 44 respectively, as shown in FIGS. 4 and 5. These straps may be mounted to the frame 72 in any suitable manner and serve as stops to maintain the frame 74 in a predetermined central location relative to the rods 40 and 44.

Movement of the frame 72 between operative and inoperative positions is effected manually by providing suitable light-proof operating means which preferably takes the form of the linkage shown in FIGS. 1, 2 and 3. This linkage comprises a connecting clevis 88, a drive arm 90, an operating shaft 92 and a handle 94. As best shown in FIG. 3, clevis 88 is substantially U-shaped in configuration and is rigidly fastened to a side 75 of the frame 72. One end of the drive arm 90 is positioned within clevis 88 and is pivotally connected thereto by a pin 96 which passes freely through an elongate slot 98 in the drive arm 90. The other end of the drive arm is secured to one end of the operating shaft 92, and the other end of the shaft is rotatably journalled in a machine side plate and extends outwardly through the side cover SC. The handle 94 for actuating the linkage arrangement is affixed to the end of the shaft extending through the side cover. It will be understood that the particular form of the driving means for the frame 72 is not of importance so long as the operator can readily position the frame along the rails 48, 50 at will, and the structural arrangement is such that any projection of the drive to the exterior of the light-tight housing H is such that it can be properly sealed against light entry.

With reference to FIG. 2, it will be seen that actuation of the handle 94 from the full line to the dotted line position is effective to move the screen assembly from the exposure station 20 to the inoperative position indicated in dotted lines at 21. Movement of the screen assembly is arrested when it reaches its inoperative position by a pair of stops 106 and 107 mounted to the top surfaces of the blocks 30 and 34 respectively, as shown in FIGS. 2 and 3, which contact the side 75 of the frame 72 to thereby prevent further movement of the screen assembly. A similar arrangement is provided for arresting the screen assembly at the exposure station, comprising stops 108 and 109 mounted to the top surfaces of the blocks 28 and 32, and which contact the other side of the frame 72, thereby affording positive and accurate positioning of the screen assembly at the exposure station.

As shown in FIGS. 2 and 4, frame 72 provides an opening 100 between its side walls and end walls to permit projection of an image from the mirror MR, through the photographic screen 74 and onto the sensitized master M. The upper surface of the frame is recessed adjacent the inside surfaces afforded by the opening 100 to thereby form a ledge 102 for supporting the photographic screen in the frame. The screen is conventional in construction and is preferably made of a pair of ground glass plates laminated together. One surface of each of the glass plates is provided with closely spaced parallel lines inscribed therein, with the lines on one plate being perpendicular to the lines on the other plate. In this way, when the plates are laminated together, the inscribed lines form a grid pattern 104 as shown in FIG. 3 of the drawings. The inscribed lines may be filled with coloring material to provide greater contrast thereto.

It should be understood that the surface of the screen must be exactly parallel to the surface of a master held by the vacuum head 18 within very close tolerances. This can be accomplished by adjusting the position of the lock nuts on the four screws 29, 31, 33 and 35. These nuts can also be used to set the bodily spacing of the screen surface from the master surface so as to accord exactly with the reading indicated by the markings on the dial 62.

The overall operation of the apparatus of the present invention will now be described. A photograph, or other continuous tone original to be reproduced, is placed on the copy board CB. The vacuum source serving the vacuum head 18 is then turned on. Movement of the handle 16 from the full line position shown in FIG. 2 to the dotted line position shown in FIGS. 1 and 2, is effective to raise the tray 10 to the vacuum head which removes the top master from the stack of masters M contained in the tray. As soon as the master is picked up by the vacuum head, the tray is lowered by moving handle 16 back to the full line position shown in FIG. 2. The screen assembly is now moved from its inoperative position to the exposure station 20 by actuating handle 94 in an anticlockwise direction which, through the linkage 88 and 90, moves the screen assembly into solid line position (FIG. 2) with the rollers 76 and 77 riding on the rail 50, and with the rollers 78 and 79 riding on the rail 48.

With the screen assembly in proper position at the exposure station, as controlled by the stops 108 and 109, the vertical position of the screen may be adjusted by rotating the knob 64 to obtain the proper screen distance setting as indicated by the dial 62. Rotation of the knob 64, through the worm and worm wheel arrangement described above, is effective to rotate the bars 40 and 44 in opposite directions (see FIGS. 4 and 5) and thereby tilt the rails 48 and 50 respectively in either an upward or downward direction. This tilting of the rails, of course, imparts a very gradual vertical movement to the screen assembly as a result of the rollers riding on the rails 48 and 50, and affords precise adjustment of the spacing of the screen from the position which the master will occupy when it reaches the exposure station.

When the foregoing settings have been made, the vacuum head is moved by suitable means (not shown) from the master pick up station to the exposure station 20. At this position the master is retained by the vacuum head with its sensitized surface facing downwardly and in closely spaced relation to the top surface of the screen 74. Conventional illuminating means is then turned on, whereby the lens L projects the image of the illuminated original via the mirror MR, through the photographic screen 74 and onto the sensitized master M. The duration of the exposure period is preferably controlled by presetting a conventional timer control. Upon completion of this screened exposure, it is normally desired to effect a "bump," i.e., to conduct a brief additional exposure without a screen in order to clear the highlights and provide improved contrast differential resulting in a more faithful reproduction of the original. This is normally required whether the photosensitive member M is a negative working material or a positive-working material, but in the latter case, a "bump" treatment is also needed to eliminate the screen pattern from clear or highlight areas.

In any event, the foregoing bumping procedure can be accomplished by merely moving the handle 94 to the dotted line position of FIG. 2, setting the timer for whatever additional non-screened exposure is required, and then activating the illumination source for this additional time.

On completion of the exposure of the master, the vacuum head 18 is restored to the dotted line position shown in FIGS. 1 and 2, from where the master is picked up and transported through the processing unit 23 of the machine. Subsequently, the developed master is delivered to the receiving rack 22, and it may be placed directly on the drum of an offset duplicator for reproducing copies or it may be stored for future use.

From the foregoing, it will be appreciated that the novel device of the present invention provides for quick and accurate positioning of a photographic screen at the exposure station to reproduce a half tone image on an offset master from a continuous tone original. Further, the screen device provides for the adjustment of the screen spacing so as to obtain optimum images on the master from various types of originals. Also, the device is simple to operate and can be readily installed on existing camera processor units. Primarily the device makes it possible for a relatively inexperienced operator to handle a fragile half tone screen so as to place it in operative and inoperative positions during the normal exposure procedures suited to half tone reproduction of continuous tone originals, and still avoid any risk of exposing the photosensitive material to extraneous light or endangering the screen by handling the same. Moreover, it is possible to effect the necessary manipulation and still maintain the extremely accurate settings for screen location relative to the photosensitive surface.

Thus, while I have illustrated and described a preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In photographic apparatus for reproducing half-tone images on sensitized sheet material the combination comprising:

means providing an exposure station for sensitized sheet material in a horizontal plane in position to receive exposure illumination via a light path from an exposure source;

a half-tone screen movable between an inoperative position remote from the exposure station and an operative position at the exposure station wherein it is parallel to and slightly spaced from a sensitized sheet at the station;

a pair of guide rails extending horizontally between the inoperative and operative positions for supporting by gravity the half-tone screen during movement, said guide rails being mounted for rocking about longitudinally extending axes;

means rollingly supporting said half-tone screen on said rails;

means for moving the half-tone screen between the inoperative and operative positions; and means for rocking the guide rails about axes parallel thereto in opposite directions to provide for adjusting the spacing from the sensitized sheet of the half-tone screen, in a vertical direction, when the screen is in operative position.

2. Photographic apparatus as set forth in claim 1 in which the means for rocking and lowering the guide rails includes means for moving them simultaneously in equal degree.

3. Photographic apparatus as set forth in claim 2 which includes in addition means for adjusting the level of the rails at two points along each rail for bringing the screen into parallelism with the sensitized sheet material at the exposure station.

4. Photographic apparatus as set forth in claim 1 in which the means for rocking the guide rails comprises:

a manually rotatable shaft;

a gear drive connecting the shaft to both guide rails.

5. In photographic apparatus for reproducing half-tone images on sensitized sheet material the combination comprising:

a copyboard for retaining in a vertical position an original document to be reproduced;

means providing an exposure station for sensitized sheet material in a horizontal plane in position to receive upwardly directed exposure illumination;

means including a mirror for projecting the light image of an original document on the copyboard onto the sensitized sheet;

a half-tone screen of fragile, easily damaged material movable relative to said exposure station between an inoperative position remote from said exposure station and clear of said light path to permit and exposure at said station without the effect of the screen, and an operative position at said exposure station intercepting said light path, wherein it is parallel to and slightly spaced from a sensitized sheet at said station;

a pair of guide rails extending horizontally between the inoperative and operative positions for supporting by gravity the half-tone screen during movement;

means rollingly supporting said half-tone screen on said rails;

a light-tight housing enclosing the exposure station, and enclosing the screen in all its positions and protecting it from damage;

means for moving the screen between said inoperative and operative positions including control means accessible to the operator exteriorly of the housing; and means for so moving the guide rails as to adjust the spacing from the sensitized sheet of the screen, in a vertical direction, when the screen is in operative position.

6. Photographic apparatus as set forth in claim 5 in which the guide rails are mounted for rocking about longitudinally extending axes, and the means for moving the guide rails is arranged to cause rocking of the rails about said axes in opposite directions.

References Cited

UNITED STATES PATENTS

| | | | |
|---|---|---|---|
| 2,044,184 | 6/1936 | Powers | 96—116 |
| 2,036,211 | 4/1936 | Grant | 96—116 XR |
| 2,115,233 | 4/1938 | Powers | 96—116 |
| 2,150,974 | 3/1939 | Huebner | 96—116 XR |
| 2,402,107 | 6/1946 | Wekeman | 96—116 XR |
| 2,564,934 | 8/1951 | Sussin | 96—116 |
| 2,643,187 | 6/1953 | Linzell | 96—116 |
| 3,041,931 | 7/1962 | Anander | 96—116 XR |

FOREIGN PATENTS

| | | |
|---|---|---|
| 105,458 | 10/1938 | Australia. |

NORMAN G. TORCHIN, Primary Examiner

RONALD H. SMITH, Assistant Examiner

U.S. Cl. X.R.

95—79